Sept. 15, 1953    F. J. GRIFFITH    2,652,018
CHAIN PIPE COVER AND SEAL
Filed June 12, 1952

Inventor:
Frederick J. Griffith
by his Attorneys
Darby & Darby

Patented Sept. 15, 1953

2,652,018

UNITED STATES PATENT OFFICE 2,652,018

CHAIN PIPE COVER AND SEAL

Frederick J. Griffith, New York, N. Y.

Application June 12, 1952, Serial No. 293,221

5 Claims. (Cl. 114—180)

The present invention relates to chain pipe covers and particularly to such covers which are made in a manner which permits them to be readily and speedily put in place and removed and to be reused indefinitely. The chain pipe cover of this invention is additionally much more economically produced than is any other type of chain pipe cover now on the market.

Anchor chain is customarily stored in a chain locker below deck and let out through a chain pipe which frequently extends through the deck. This opening has to be sealed when the vessel is at sea in order to prevent the chain locker from filling with water. In the past it has been common practice to seal off the chain pipe with burlap and concrete. When the vessel arrives in port this burlap and concrete has to chipped away so that the anchors may be used and upon departure the burlap and concrete has to be replaced. It not infrequently happens that before the concrete is hardened the ship runs into heavy seas, the concrete is washed away and the chain locker and storerooms become flooded and have to be pumped out and the chain pipe resealed.

Recently there has been developed a chain pipe cover which is made of manganese bronze and is heavily gasketed. This is an improvement over the old-fashioned method mentioned above, but has the great disadvantage that it is heavy and awkward to apply, and extremely expensive.

My invention comprises a hollow resilient plug which may be made of heavily reenforced rubber or plastic composition and which is inserted in the chain pipe about the chain and then inflated to cause it to seal tightly against both the chain and the chain pipe walls. This device is much lighter and more readily placed and effects a tighter seal and is much cheaper than is the bronze device mentioned hereinabove.

It is an object of my invention to provide a chain pipe cover which is light in weight, readily installed in place and removed, and which effects a tight seal.

It is a further object of my invention to provide a device as mentioned above which, although light in weight, is nonetheless rugged and capable of use over a long period of time.

It is a further object of my invention to provide such a device which, despite its many advantages, can be manufactured for a cost far below that of presently used chain pipe covers.

Other objects and features of the invention will be apparent when the following description is considered in connection with the annexed drawings, in which, Figure 1 is a cross-sectional view of a fragment of a deck showing the chain pipe with a chain therein and a chain pipe cover, in accordance with my invention, positioned in the chain pipe about the anchor chain;

Figure 1:
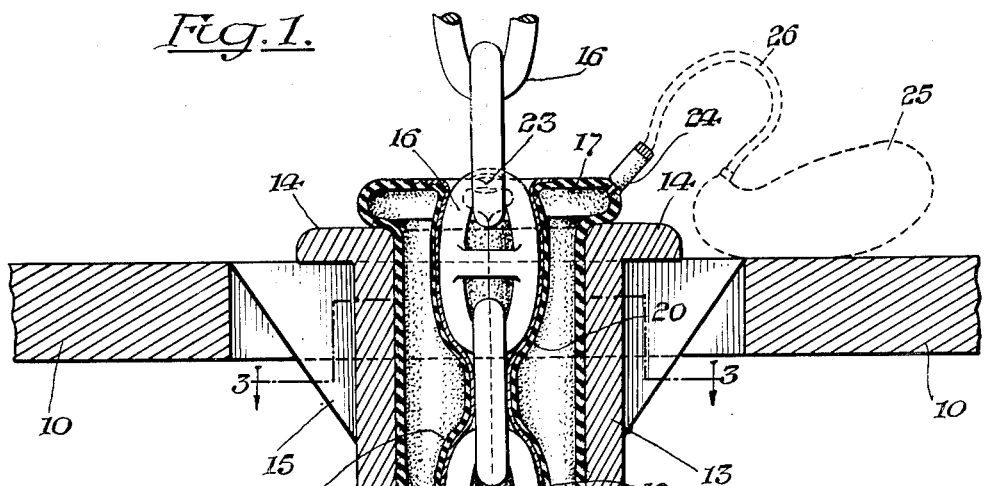

Referring now to the drawings, there is shown in Figure 1 at 10 the usual deck of a vessel having an opening therein in which is inserted the chain pipe 13 which pipe has a flange 14 which sits on the deck, the flange being connected to the pipe by the reenforcing webs 15. Anchor chain 16 is fed through the pipe 13 into the chain locker in the usual manner, the length of the chain pipe 13 being ordinarily in the neighborhood of two feet and the usual anchor chain having links, the dimensions of which are approximately six by ten inches. Thus there will be somewhat more than two links within the pipe 13.

The chain pipe plug or cover of my invention comprises a flexible, generally cylindrical member 17, the walls 18 of which are formed of rubber or plastic material. These walls may be reenforced in part with plastic, steel, or alloy metals; in the drawings fabric reenforcement is shown.

Figure 4:
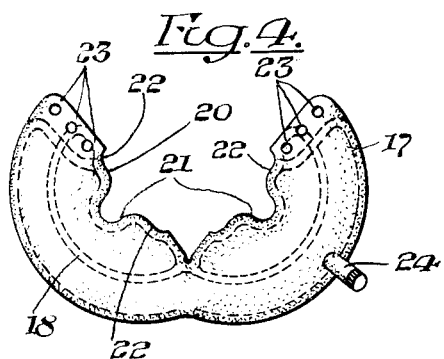
Figure 4 is a top plan view of the chain pipe cover alone showing particularly one mode of fastening the cover in position about the anchor chain.

As is shown in Figure 4, the plug 17 is made in a form which consists essentially of two semicylindrical sections joined together adjacent one edge, the entire structure, however, being provided with a single cavity so that it may be inflated as a unit.

Figure 3:
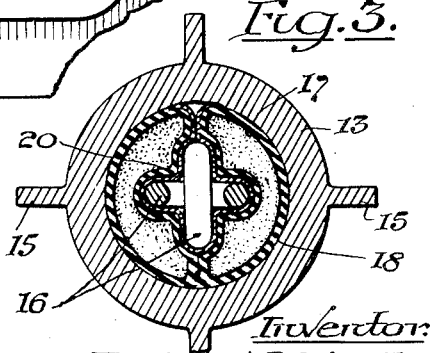
Figure 3 is a horizontal cross-sectional view of the chain pipe cover and anchor chain, the view being taken on the plane of the line 3—3 of Figure 1.

As shown clearly in Figures 3 and 4, the inner walls 20 of the semicylindrical portions of the plug are provided with mating sections 21 and 22 which form, when the two semicylindrical portions are closed, a cross-shaped opening which extends longitudinally of the plug.

Preferably, the inner walls 20 are made thinner or more resilient than the outer walls, so that they may conform snugly to the configuration of the chain and provide a good seal and are faced with re-enforcing fabric 19.

Extending along the mating inner edges 20 of the tops of the two semicylindrical portions are lines of fastening members indicated at 23. These fastening members may be, for example, grommets extending through thickened portions of these inner walls through which grommets a lacing may extend to hold the two portions closed upon the anchor chain, or may be clamps of suitable type. Obviously, other types of fastenings may be utilized and in many instances no fastenings need be supplied since inflation of the plug will hold it securely in place.

The device is installed by placing it about the chain, closing the device, sliding it down into the chain pipe into the position shown in Figure 1, and thereafter inflating the device with air or other non-freezing fluid to distend its walls and form a tight seal with both the inner walls of the chain pipe and the links of the anchor chain.

Figure 2:
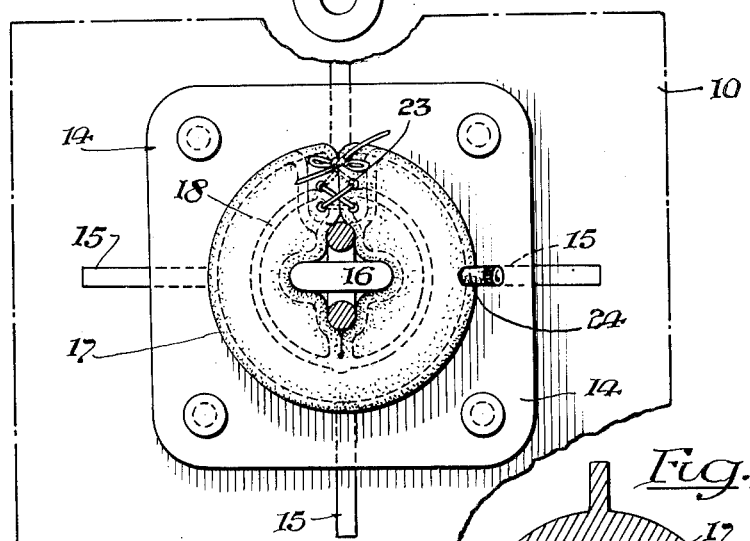
Figure 2 is a top plan view of the structure illustrated in Figure 1.

The device is, of course, provided with an inlet opening for inflation, indicated at Figures 1, 2 and 4 at 24, which opening is provided with a check valve so that the pressure may be retained. One manner of inflating the device is indicated in Figure 1. In this arrangement a bulb 25 of heavy, tough, flexible material is provided with a tube 26 which may be attached to the inlet valve 24. Bulb 25 may be laid upon the deck, as shown, being filled with air or other fluid and then coupled to the valve 24 whereupon by stepping upon the bulb the chain pipe cover 17 becomes inflated. It may also have its own air inlet and check valve. The above-described method of inflation is, of course, optional and many substitutions may be made therefor. For example, an ordinary tire pump may be utilized to inflate the device or it might be filled with water under pressure, the water having anti-freeze added thereto.

The steps to be followed in removing the plug are obvious, comprising merely the release of the fluid pressure and removal from the chain pipe and chain.

While I have described the preferred form of my invention, it will be understood that many modifications of the structure may be made within the scope of the invention. Therefore, I wish to be limited not by the foregoing description but, on the contrary, solely by the claims granted to me.

What is claimed is:

1. A chain pipe cover plug comprising, in combination, two hollow at least partially resilient generally semicylindrical members joined along one edge and having a single internal cavity, the plane wall of each said member having longitudinal grooves therein, said grooves forming a cross-shaped longitudinal bore conforming to an anchor chain shape when said two members are closed against each other, and means for creating and retaining pressure in said internal cavity to cause said members to press against the inner walls of a chain pipe and against the links of an anchor chain extending through said longitudinal bore.

2. A chain pipe cover plug comprising, in combination, two hollow resilient generally semicylindrical members joined along one edge and forming a single internal cavity, each said semicylindrical member having a flange extending throughout its circumferential portion at the upper edge thereof, the plane wall of each said member having longitudinal grooves therein, said grooves forming a cross-shaped longitudinal bore conforming to an anchor chain shape when said two members are closed against each other, and means for creating and retaining pressure in said internal cavity to cause said members to press against the inner walls of a chain pipe and against the links of an anchor chain extending through said longitudinal bore, said circumferential flange overlying the flange of the chain pipe when the cover is in place.

3. A chain pipe cover plug comprising, in combination, two hollow at least partially resilient generally semicylindrical members joined along one edge forming a single internal cavity, the plane wall of each said member having longitudinal grooves therein, said grooves forming a cross-shaped longitudinal bore when said two members are closed against each other, means for fastening the said semicylindrical portions with their adjacent plane walls in contact, and means for creating and retaining pressure in said internal cavity to cause said members to press against the inner walls of a chain pipe and against the links of an anchor chain extending through said longitudinal bore.

4. A chain pipe cover comprising, in combination, two hollow generally semicylindrical members joined along one edge forming a single internal cavity, each said cylindrical member having a flange extending throughout its circumferential portion at the upper edge thereof, the plane wall of each said member being resilient and having longitudinal grooves therein, said grooves forming a cross-shaped longitudinal bore conforming to an anchor chain shape when said two members are closed against each other, means for fastening the said semicylindrical portions with their adjacent plane walls in contact, and means for creating and retaining pressure in said internal cavity to cause said members to press against the inner walls of a chain pipe and the links of an anchor chain extending through said longitudinal bore, said circumferential flange overlying the flange of the chain pipe when the cover plug is in place.

5. A chain pipe cover plug comprising, in combination, two hollow generally semicylindrical members joined along one edge forming a single internal cavity, said members being formed of flexible material, the plane wall of each said member having longitudinal grooves therein and being resilient, said grooves forming a cross-shaped longitudinal bore conforming to an anchor chain plug when said two members are closed against each other, and means for creating and retaining pressure in said internal cavity to cause said members to press against the inner walls of a chain pipe and the links of an anchor chain extending through said longitudinal bore.

FREDERICK J. GRIFFITH.

References Cited in the file of this patent

UNITED STATES PATENTS

| Number | Name | Date |
|---|---|---|
| 43,793 | Perley | Aug. 9, 1864 |
| 360,164 | Lavery | Mar. 29, 1887 |
| 1,301,204 | Warner et al. | Apr. 22, 1919 |
| 1,319,464 | Durbin | Oct. 21, 1919 |
| 1,774,185 | Peterson | Aug. 26, 1930 |
| 2,182,899 | MacClatchie | Dec. 12, 1939 |
| 2,351,343 | Kelley | June 13, 1944 |
| 2,475,429 | Humason | July 5, 1949 |
| 2,508,078 | Rowley et al. | May 16, 1950 |
| 2,517,655 | Gillespie | Aug. 8, 1950 |
| 2,606,046 | Bonner et al. | Aug. 5, 1952 |